United States Patent
Harp

(10) Patent No.: US 10,712,943 B2
(45) Date of Patent: Jul. 14, 2020

(54) DATABASE MEMORY MONITORING AND DEFRAGMENTATION OF DATABASE INDEXES

(71) Applicant: Idera, Inc., Houston, TX (US)

(72) Inventor: Vicky Harp, Nipomo, CA (US)

(73) Assignee: IDERA, INC., Southlake, TX (US)

( * ) Notice: Subject to any disclaimer, the term of this patent is extended or adjusted under 35 U.S.C. 154(b) by 0 days.

(21) Appl. No.: 15/832,021

(22) Filed: Dec. 5, 2017

(65) Prior Publication Data

US 2018/0196610 A1  Jul. 12, 2018

Related U.S. Application Data

(60) Provisional application No. 62/430,226, filed on Dec. 5, 2016.

(51) Int. Cl.
*G06F 3/06* (2006.01)
*G06F 16/22* (2019.01)

(52) U.S. Cl.
CPC .......... *G06F 3/0608* (2013.01); *G06F 3/0604* (2013.01); *G06F 3/067* (2013.01); *G06F 3/0647* (2013.01); *G06F 16/2272* (2019.01); *G06F 16/2282* (2019.01)

(58) Field of Classification Search
CPC .... G06F 3/0608; G06F 3/0604; G06F 3/0647; G06F 3/067; G06F 16/2282; G06F 16/2272
See application file for complete search history.

(56) References Cited

U.S. PATENT DOCUMENTS

2011/0225164 A1   9/2011 Narasayya et al.
2013/0332428 A1* 12/2013 Narasayya .............. G06F 16/22
                                              707/693

OTHER PUBLICATIONS

Narasayya, Vivek, and Manoj Syamala. "Workload driven index defragmentation." 2010 IEEE 26th International Conference on Data Engineering (ICDE 2010). IEEE, 2010. (Year: 2010).*
United Kingdom Office Action, dated Jun. 1, 2018, GB1720252.4, pp. 1-4.
United Kingdom Combined Search and Examination Report, dated Jun. 1, 2018, GB1720253.4, pp. 5-9.
Response to the Combined Search and Examination Report dated Jun. 1, 2018, as filed in GB1720253.4, on Feb. 9, 2019, pp. 1-27.

* cited by examiner

*Primary Examiner* — Charles Rones
*Assistant Examiner* — Hewy H Li
(74) *Attorney, Agent, or Firm* — Kent B. Chambers; Terrile, Cannatti & Chambers, LLP

(57) ABSTRACT

A memory monitoring and selective defragmentation method and system disclosed herein monitor memory usage by and modification of one or more database indexes. The monitoring and selective defragmentation method and system selectively defragment the one or more database indexes based on memory cost savings as opposed to a percentage of fragmentation to improve performance of databases.

33 Claims, 6 Drawing Sheets

401

| DATABASE_ID | FILE_ID | PAGE_ID | ALLOCATION_UNIT_ID | FREE_SPACE_IN_BYTES |
|---|---|---|---|---|
| 77 | 1 | 33687 | 72057594046709700 | 7912 |
| 77 | 1 | 6432 | 72057594046709700 | 7906 |
| 77 | 1 | 49741 | 72057594046709700 | 7908 |
| 77 | 1 | 23572 | 72057594046709700 | 7906 |
| 77 | 1 | 40194 | 72057594046709700 | 7906 |
| 77 | 1 | 12797 | 72057594046709700 | 7906 |
| 2 | 6 | 344 | 71635381618802600 | 3755 |
| 77 | 1 | 29476 | 72057594046709700 | 7906 |
| 2 | 1 | 265 | 56294995960960256 | 1466 |

410 → DATABASE_ID, 420 → FILE_ID, 430 → PAGE_ID, 440 → ALLOCATION_UNIT_ID, 450 → FREE_SPACE_IN_BYTES

| DATABASE_ID | FILE_ID | ALLOCATION_UNIT_ID | FREE_SPACE_IN_BYTES | COUNT OF PAGES (CALCULATED) | AVERAGE PAGE FREE SPACE (CALCULATED) |
|---|---|---|---|---|---|
| 77 | 1 | 72057594046709700 | 55350 | 7 | 7907.14 |
| 2 | 6 | 71635381618802600 | 3755 | 1 | 3755 |
| 77 | 1 | 72057594046709700 | 7906 | 1 | 7906 |

410 → DATABASE_ID, 420 → FILE_ID, 440 → ALLOCATION_UNIT_ID, 450 → FREE_SPACE_IN_BYTES, 452 → COUNT OF PAGES, 454 → AVERAGE PAGE FREE SPACE

FIG. 4B

FIG. 4C (PART 1)

| DATABASE_ID | OBJECT_ID | INDEX_ID | PARTITION_NUMBER | INDEX_TYPE_DESC | ALLOC_UNIT_TYPE_DESC | INDEX_DEPTH | INDEX_LEVEL | AVG_FRAG_IN_PERCENT |
|---|---|---|---|---|---|---|---|---|
| 77 | 341576255 | 1 | 1 | CLUSTERED INDEX | IN_ROW_DATA | 2 | 0 | 33.33333 |
| 77 | 341576255 | 1 | 1 | CLUSTERED INDEX | IN_ROW_DATA | 2 | 1 | 0 |
| 77 | 741577680 | 1 | 1 | CLUSTERED INDEX | IN_ROW_DATA | 2 | 0 | 44.44444 |
| 77 | 741577680 | 1 | 1 | CLUSTERED INDEX | IN_ROW_DATA | 2 | 1 | 0 |

FIG. 4C (PART 2)

| FRAGMENT_COUNT | AVG_FRAG_SIZE_IN_PERCENT | PAGE_COUNT | AVG_PAGE_SPACE_USED_IN_PERCENT | RECORD_COUNT | GHOST_RECORD_COUNT | VERSION_GHOST_RECORD_COUNT | MIN_RECORD_SIZE_IN_BYTES | MAX_RECORD_SIZE_IN_BYTES | AVG_RECORD_SIZE_IN_BYTES | FORWARDED_RECORD_COUNT | COMPRESSED_PAGE_COUNT |
|---|---|---|---|---|---|---|---|---|---|---|---|
| 2 | 1.5 | 3 | 96.95248033 | 91 | 0 | 0 | 184 | 342 | 256.769 | NULL | 0 |
| 1 | 1 | 1 | 0.679815691 | 3 | 0 | 0 | 17 | 17 | 17 | NULL | 0 |
| 5 | 1.8 | 9 | 91.68945614 | 2155 | 0 | 0 | 29 | 29 | 29 | NULL | 0 |
| 1 | 1 | 1 | 1.865379442 | 9 | 0 | 0 | 13 | 13 | 13 | NULL | 0 |

FIG. 4D

| DATABASE_ID | OBJECT_ID | INDEX_ID | AVG_FRAG_IN_PERCENT | AVG_PAGE_SPACE_USED_IN_PERCENT | AVG_PAGE_SPACE_FREE_IN_BYTES_ON_DISK (CALCULATED) | INDEX_LEVEL |
|---|---|---|---|---|---|---|
| 77 | 341576255 | 1 | 33.33 | 96.95 | 249.63 | 7907.14 |
| 77 | 741577680 | 1 | 44.44 | 91.68 | 681.37 | 3755 |

DATABASE MEMORY MONITORING AND DEFRAGMENTATION OF DATABASE INDEXES

CROSS-REFERENCE TO RELATED APPLICATION

This application claims the benefit under 35 U.S.C. § 119(e) and 37 C.F.R. § 1.78 of U.S. Provisional Application No. 62/430,226, filed Dec. 5, 2016, and entitled "Memory Monitoring and Defragmentation," which is incorporated by reference in its entirety.

BACKGROUND OF THE INVENTION

Field of the Invention

The present invention relates in general to the field of electronic databases, and more specifically to monitoring and defragmenting database indexes.

Description of the Related Art

In file systems with relational databases, programming languages such as Structured Query Language (SQL) are used for managing data. The data may be stored in pages, which are logical or physical database distinctions of a file. Each page typically holds up to a predetermined amount of data, such as 8192 bytes of data. Pages are typically filled based on their availability, and ideally, the pages stay in order in an index. FIG. 1 depicts a simplified diagram of a portion of a database 100, illustrating the concept of pages. As depicted in FIG. 1, the first four pages 101-104 are in order based on alphabetic fields. A first page 101 contains a first set of data (shown here as all A's), a second page 102 contains a second set of data (shown here as all B's), a third page 103 contains a third set of data (shown here as all C's), and a fourth page 104 contains a fourth set of data (shown here as all D's).

With continued use, additional data may be stored to the database and data may be deleted from the database. As information is added to or deleted from a database, new pages may be added and data may be removed from pages. As a result, pages may be out of order. Furthermore, the original pages might not be full due to deletions and any additional pages may also not be full, resulting in free space. Also, in some scenarios, a page might be split into multiple pages to store data. The additional pages are not necessarily stored in memory next to the original page. Thus, continuing with the example depicted in FIG. 1, a page may be split such that new page 105 contains data (e.g., A's) that should be grouped with the first page 101 (i.e., all A's), but is actually ordered after the last page 104 (i.e., all D's). As a result, page 105 is logically aligned with page 101 but is physically separated by being stored in non-contiguous memory space, which results in memory fragmentation.

Fragmentation includes page fragmentation and index fragmentation. Index fragmentation in relational and near-relational databases results in non-optimal space utilization and pages being out of order. One consequence of this disorder (or fragmentation) is wasted storage space. Furthermore, fragmentation can negatively impact query performance. For example, a feature of relational databases is the capability for read-ahead operations, but fragmentation can prevent read-ahead operations on indexes. In the example depicted in FIG. 1, a read-ahead operation may be performed by reading the pages in order (i.e., left to right). In contrast, FIG. 2 depicts a diagram illustrating a problem with read-ahead operations as a result of fragmentation. As illustrated in FIG. 2, a first page 201 is read and a third page 203 is read as part of the read-ahead operation (indicated by a solid line). However, because the third page 203 is out of order, the second page 202 is not read (indicated by a dashed line). Usually, any operation requiring a read-ahead function stops as a result of the fragmentation.

To fix or avoid the problems associated with fragmentation, defragmenting systems and methods have been developed for defragmenting data. Defragmentation is a process used to reduce the amount of fragmentation by physically organizing the contents of the file system into the smallest number of contiguous portions. Approaches to manage defragmentation of indexes analyze the fragmentation levels of all indexes, generally with some filtering to limit checks to indexes larger than a minimum size. This data is then presented with severity based on the degrees of fragmentation (i.e., the ratio of the optimal number of index pages in use to the actual number of pages in use. Generally, all indexes are treated as approximately equal in terms of the prospective impact of an index rebuild.

Defragmentation minimizes space in physical memory to improve data read-write throughput to enable read-aheads. One of the benefits of defragmentation is increased space in main memory (e.g. random access memory (RAM)), which is reserved memory for the structured query language (SQL) server. When pages on disk are read, they are read into a buffer pool, which mirrors what is stored in secondary memory (e.g. a mass storage hard drive). One result of fragmentation is the reduced storage capacity in secondary memory. Thus, in a secondary memory having 10 gigabytes of storage, it is possible that only 5 gigabytes are available due to fragmentation and the remaining space might not be usable for other processes. Furthermore, if the size of a database is too large or if there is little time, a full defragmentation might not be possible. For example, an online shopping site must be accessible for users to place orders, and taking the database offline for any length of time can negatively affect sales. Additionally, conventional defragmentation can be relatively slow.

SUMMARY OF THE INVENTION

In one embodiment of the present invention, a method for monitoring and selectively defragmenting one or more database indexes included in a database includes performing by an information handling system:
  monitoring secondary memory of the information handling system, wherein:
    the information handling system includes a main memory and secondary memory that collectively store the database including the one or more database indexes;
    the one or more database indexes are stored in the secondary memory;
    each of the one or more database indexes includes a respective number of pages;
    for each of the one or more database indexes, each of the pages includes data that is logically aligned in an order specified by the index; and
    for each of the one or more database indexes, the pages are stored in contiguous memory space in the secondary memory, each of the pages has a data capacity;

modifying the data in the database, wherein:
    modifying the data causes fragmentation of at least one of the one or more indexes;
    fragmentation at least one of the one or more indexes is represented by at least one of:
        changes in the number of pages in one or more of the indexes; and
        logically aligned data in two or more pages of the one or more indexes is stored in non-contiguous memory space of the memory;
    identifying any free space in the pages of the one or more indexes stored in secondary memory;
    determining fragmentation statistics of the identified indexes;
    using the index fragmentation statistics to calculate secondary memory cost savings for rebuilding the one or more indexes; and
    selectively defragmenting the one or more indexes in the secondary memory based on the secondary memory cost savings for rebuilding the one or more indexes.

In another embodiment of the present invention, an information handling system includes:
    a processor executing a monitoring and selective defragmentation application to cause the information handling system to:
        monitor secondary memory of the information handling system, wherein:
            the information handling system includes a main memory and secondary memory that collectively store the database including the one or more database indexes;
            the one or more database indexes are stored in the secondary memory;
            each of the one or more database indexes includes a respective number of pages;
            for each of the one or more database indexes, each of the pages includes data that is logically aligned in an order specified by the index; and
            for each of the one or more database indexes, the pages are stored in contiguous memory space in the secondary memory, each of the pages has a data capacity;
        modify the data in the database, wherein:
            modify the data causes fragmentation of at least one of the one or more indexes;
            fragmentation at least one of the one or more indexes is represented by at least one of:
                changes in the number of pages in one or more of the indexes; and
                logically aligned data in two or more pages of the one or more indexes is stored in non-contiguous memory space of the memory;
        identify any free space in the pages of the one or more indexes stored in secondary memory;
        determine fragmentation statistics of the identified indexes;
        use the index fragmentation statistics to calculate secondary memory cost savings for rebuilding the one or more indexes; and
        selectively defragment the one or more indexes in the secondary memory based on the secondary memory cost savings for rebuilding the one or more indexes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 4A-4D depict tables, illustrating exemplary data generated during a defragmentation process.

DETAILED DESCRIPTION

Embodiments of a memory monitoring and selective defragmentation method and system disclosed herein monitor memory usage by one or more databases, improving performance of memories, and particularly useful for defragmenting space in memory in an information handling system based on memory cost savings as opposed to a percentage of fragmentation. The monitoring and selective defragmentation method and system selectively defragment one or more database indexes based on memory cost savings as opposed to a percentage of fragmentation to improve performance of databases. The information handling system, such as a desktop, laptop, server, or other computer system, may have disk space in secondary memory and memory space in main memory, and the disk space may be larger and hold more data than the memory space. However, the data stored in main memory may be more critical. For example, secondary memory may store all the purchases ever conducted through an online store that has been in existence for 10 years, whereas main memory space may store only the purchases made within the last day. The data associated with purchases made 10 years ago is relatively static. The purchases made within the last day include purchases that are still being filled, are in route and not delivered yet, are more likely to be returned, or are under warranty and more likely to have a claim filed against them. Accordingly, this data is changing and the pages are active and usually stored in main memory for quicker access. In at least one embodiment, active pages are pages that are stored in secondary memory and main memory. Embodiments of a memory monitoring and selective defragmentation method and system disclosed herein prioritize indexes in main memory for defragmentation. In some embodiments, a priority for defragmentation may be based on a cost of the defragmentation in terms of memory consumption, based on indexes that are resident in memory and their change in free space over time, based on an average page life expectancy, or some other criteria other than just the degree of fragmentation. In other words, if there are two files and a first file (File A) is 90% fragmented and the second file (File B) is 10% fragmented, the memory monitoring and selective defragmentation method and system may determine that File B occupies more space and therefore suggest or promote defragmenting the second file, or that File B is more active and is therefore more critical, or some other criteria other than the degree of fragmentation.

Figure 1:
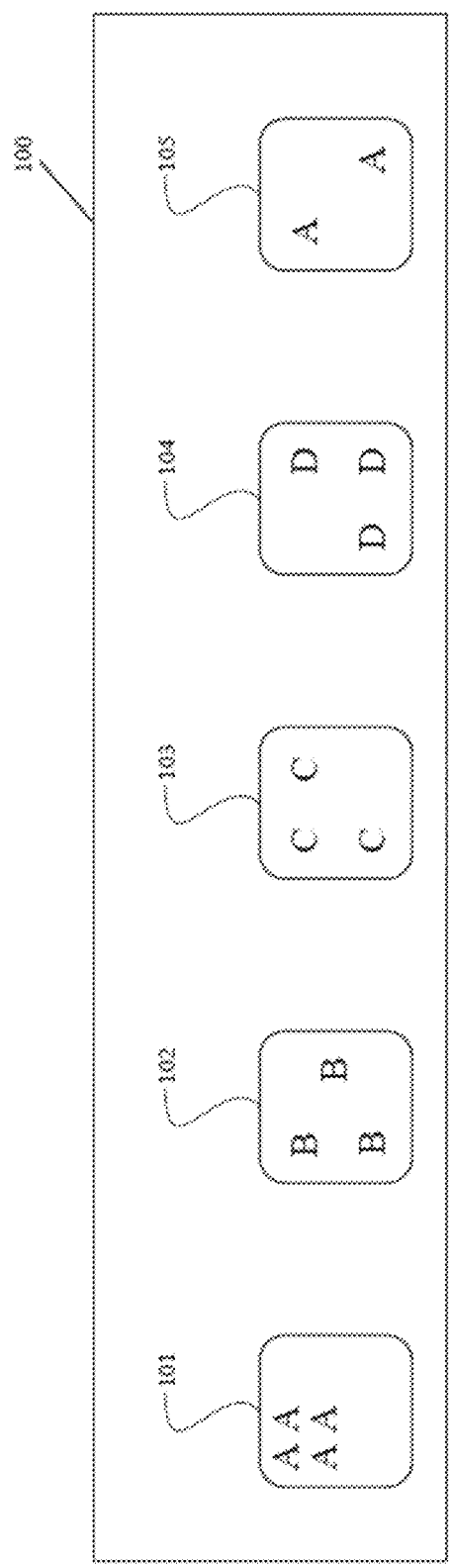
FIG. 1 depicts a simplified diagram of a portion of a database that includes pages.
Figure 2:
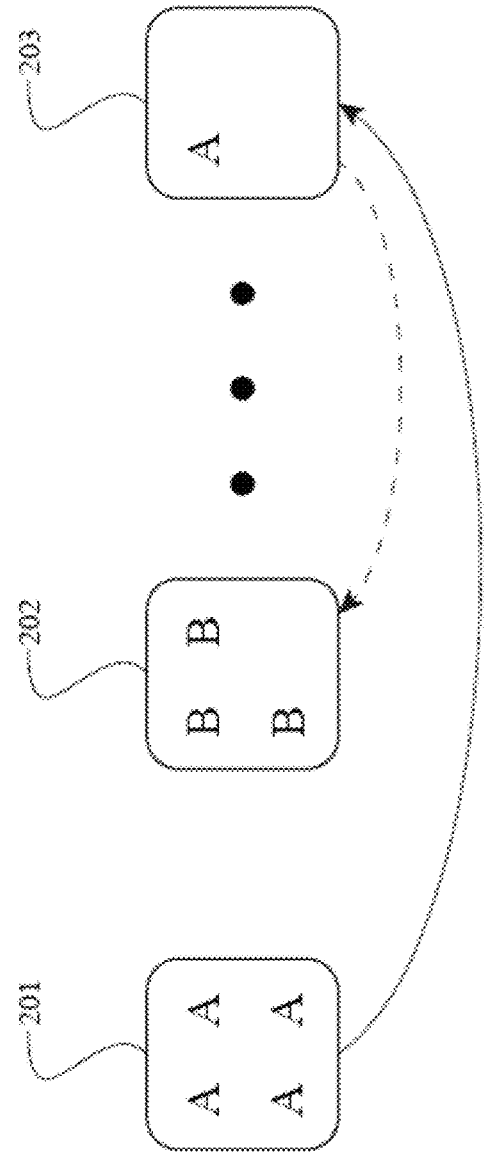
FIG. 2 depicts a diagram illustrating a problem with read-ahead operations as a result of fragmentation.
Figure 3:
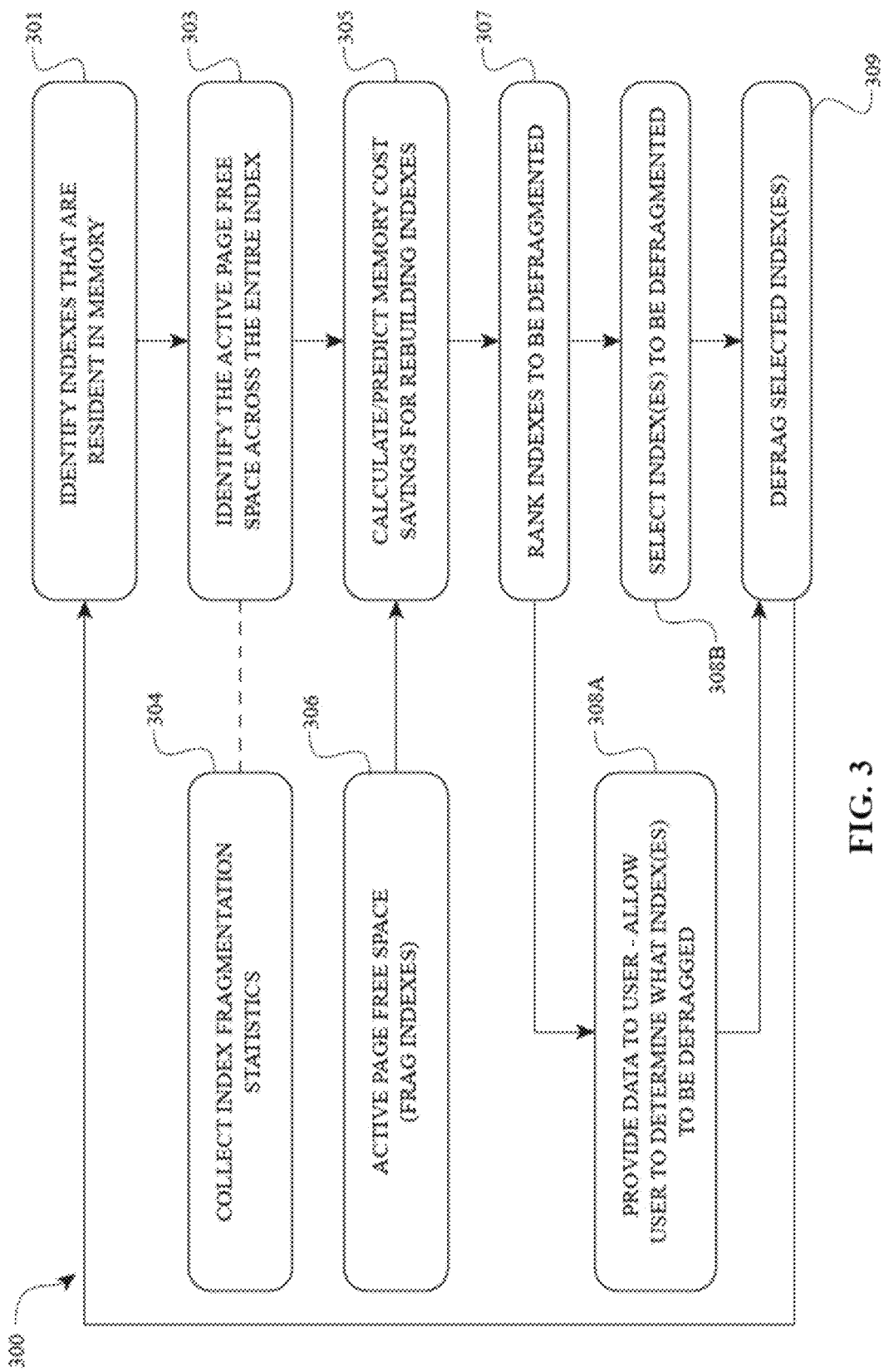
FIG. 3 depicts a flow diagram, illustrating one embodiment of the memory monitoring and selective defragmentation method

FIG. 3 depicts a flow diagram, illustrating one embodiment of the memory monitoring and selective defragmentation method 300 executing by a processor (not shown) as an application 502 stored in a non-transitory memory of the server 504. In at least one embodiment, the memory monitoring and selective defragmentation method 300 monitors secondary memory 506 based on for example, free memory space and percentage of memory fragmentation. The database server 508 is any type of database server, such as a Microsoft SQL server. The database server 508 accesses secondary memory 506 and main memory 510, which have the previously described characteristics. The physical machine implementation of server 504 and database 508 is a matter of design choice. Generally, server 504 and database server 508 are physically different data processing machines. Such distinctive machine architecture prevents both the server 504 and the database server 508 from failing if a single machine implementing both the server 504 and database server 508 fails. However, the server 504 and database server can be implemented by a single machine.

A client computer system 512 accesses the memory monitoring and selective defragmentation method application 502 generally through a network communication connection, such as an Internet connection. In at least one embodiment, the memory monitoring and selective defragmentation method application 502 provides information to the client computer system 512 regarding the results of database memory monitoring described herein, defragmentation options, past defragmentation operation data, and defragmentation control options that are selectable and operable by the client computer system 512.

The database server 508 also interacts with the memory monitoring and selective defragmentation method application 502 via the server 504. In at least one embodiment, the database server 508 collects meta-data about the memories 506 and 508 including fragmentation and identification information.

Figure 5:
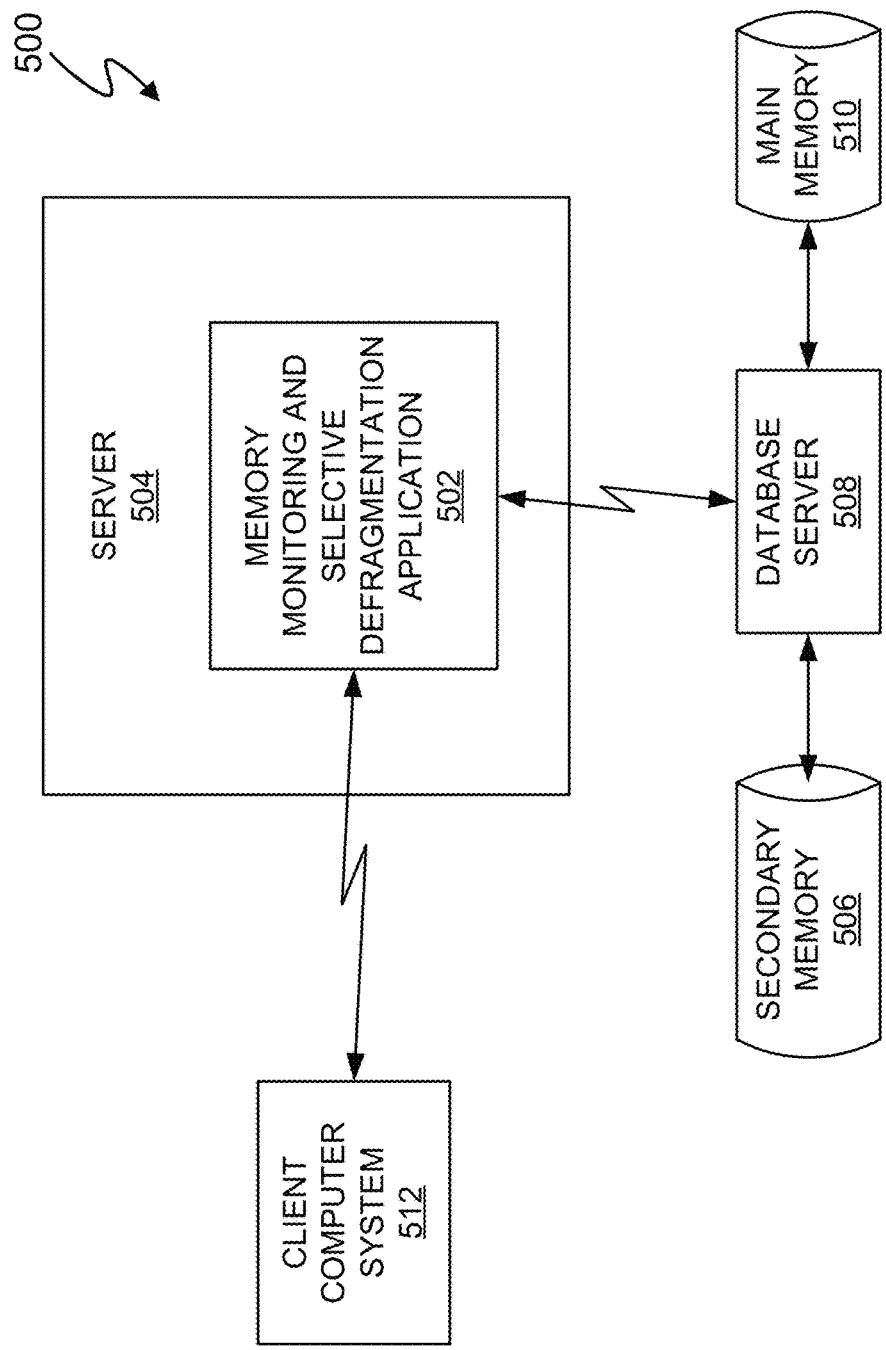
FIG. 5 depicts a networked data processing system that implements and interacts with the memory monitoring and selective defragmentation method.

In at least one embodiment, the application 502 performs the method 300 against structured databases that include meta data, such as SQL Server. The flow diagram depicted in FIG. 3 determines defragmentation based on an impact of defragmentation on memory 506 availability, in other words, based on an impact of defragmentation on memory 506 consumption. FIGS. 4A-4D depict tables, illustrating exemplary data generated during a defragmentation process according to one embodiment. FIG. 5 depicts a networked data processing system 500 that implements and interacts with the memory monitoring and selective defragmentation method 300.

Referring to FIGS. 3, 4, and 5, in at least one embodiment, the method 300 includes step 301 of identifying indexes that are resident in secondary memory 506 and their free space. In at least one embodiment, their free space refers to free space in the index on a page-by-page basis. Step 301 may include using a direct interrogation query or a query against one or more monitoring tables, such as tables containing meta data, stored in a single machine, such as an information handling system operating as a server. The query sys.dm_os_buffer_descriptors is one example of a query against a monitoring table in a database, which returns information about all the data pages that are currently in a buffer pool. A query may identify indexes that are resident in memory 506 and their free space. Identifying indexes resident in memory 506 may be based on a date range or some other criteria. Analyzing pages over time may be used to identify active pages and static pages. Identifying indexes in memory 506 and their free space over time may yield an average page life expectancy per index as well as an active page free space per index.

The memory monitoring and selective defragmentation method 300 may identify an active page free space within an index in step 303. Step 303 may include step 304 of collecting or otherwise obtaining index fragmentation statistics to identify the page free space across an index (including but not limited to active pages) and an index fragmentation level. In step 303, the memory monitoring and selective defragmentation method 300 communicates with the database to determine index fragmentation statistics. Index information statistics may be obtained in some database systems by using a query such as sys.dm_db_index_physical_stats, which returns information for data and indexes of a table or view. An index fragmentation level may be provided in terms of the number of pages or the percent of free space available. For example, an index fragmentation level may indicate there are 500 pages with free space in memory 506, or 20% available, or 500 pages at 20% free space, etc.).

In step 305, the memory monitoring and selective defragmentation method 300 uses statistics to calculate the potential secondary memory 506 cost savings for rebuilding indexes. The calculated memory cost savings may be based on the page free space associated with active pages of fragmented indexes. The result of these calculations may be focused on potential savings to a set of pages instead of focused on problem pages. In other words, there may be a first set of pages that could be targeted for defragmentation because of their activity level, free space, or the like, and a second set of pages that could be targeted for defragmentation because the cost or other detriment of defragmenting these pages is outweighed by the additional storage, ability to perform read-ahead functions, or other benefits associated with defragmentation. In contrast to memory cost savings, conventional systems utilize a percentage of fragmentation as the basis for defragmentation.

The memory monitoring and selective defragmentation method 300 may rank indexes in memory 506 to be defragmented in step 307. A ranking may be based on the predicted savings to memory 506 rather than the absolute amount of fragmentation present. In some embodiments of the memory monitoring and selective defragmentation method 300, this ranking may be based on a percent (e.g., 20% of free space in memory 506, 19% of free space in memory 506, etc.), or as an absolute value (e.g., 2 GB) of free space in memory 506 that might be reclaimed through defragmentation. The ranking may also include an estimated time for execution.

In step 308A, client computer system 512 presents a user with a set of possible indexes to be defragmented. The user can then select one or more indexes in memory 506 to target for defragmentation. In step 308B, the memory monitoring and selective defragmentation method application 502 selects one or more indexes for defragmentation. The presentation or selection of an index for defragmentation may be based on various criteria. For example, if time is a constraint, an index may be selected (or not selected) based on a predicted amount of time necessary to defragment that index. In at least one embodiment, amount of time necessary to defragment that index includes time to defragment or perform any other operations on objects dependent on the index such as non-clustered indexes or column-stored indexes. As another example, an index or a portion of the index may be excluded from a set of indexes to be defragmented.

In step 309, the selected indexes are defragmented according to a defragmentation protocol. The defragmentation protocol may be a standard or proprietary protocol. Once defragmentation is complete, method 300 may immediately perform another iteration or pause for a period of time. It should be noted that the process starts at step 301 for each iteration. In other words, if an index was the next index to be defragmented and time expired, that index is not necessarily the first index to be defragged in the next iteration.

FIGS. 4A-4D depict tables, illustrating exemplary data generated during a defragmentation process according to one embodiment. The tables can be referenced or joined by, for example, the memory monitoring and selective defragmentation application 502, to correlate pages with memory 506 space. FIG. 4A depicts a table, illustrating a portion of a defragmentation process useful for defragmenting portions of free secondary memory 506. As illustrated in FIG. 4A, information stored in table 401 may be returned from a query (such as sys.dm_os_buffer_descriptors, described above). As illustrated in FIG. 4A, a query may return information including a database identification (database_id) 410, a file identification (file_id) 420, a page identification (page_id) 430, an allocation unit identification (allocation_unit_id) 440, and quantity of free space in bytes (free_space_in_bytes) 450. Note that pages need not be stored in a particular order.

FIG. 4B depicts a table, illustrating a portion of a defragmentation process useful for defragmenting portions of free memory. Information stored in table 402 may include database identification (database_id) 410, file identification (file_id) 420, allocation unit identification (allocation_unit_id) 440, quantity of free space in bytes (free_space_in_bytes) 450, a calculated count of pages 452, and average page free space (calculated) 454. As illustrated in FIG. 4B, the data may be aggregated according to allocation unit identification 440 (such as allocation_unit_id, described above). In this example, data corresponding to seven pages with an allocation_unit_id of 72057594046709700 may be aggregated to determine there are 55350 free space (in bytes). Furthermore, the memory monitoring and selective defragmentation method 300 may determine the number of pages (the count) and determine the average page free space (e.g., 7907.14 for this example).

FIG. 4C depicts table 403 storing information such as database identification (database_id) 410, object identification (object_id) 422, index identification (index_id) 424, partition number (partition_number) 426, index type description (index_type_desc) 428, allocation unit type description (alloc_unt_type_desc) 452, index depth (index_depth) 432, index level (index_level) 434, the average fragmentation as a percent (avg_frag_in_percent) 436, the fragment count (fragment_count) 438, average fragment size as a percent (avg_frag_size_in_percent) 442, page count (page_count) 444, average page space used as a percent (avg_page_space_used_in_percent) 446, record count (record_count) 448, ghost record count (ghost_record_count) 456, version ghost record count (version_ghost_record_count) 458, minimum record size in bytes (min_record_size_in_bytes) 462, maximum record size in bytes (max_record_size_in_bytes) 464, average record size in bytes (avg_record_size_in_bytes) 466, forwarded record count (forwarded_record_count) 468 and compressed page count (compressed_page_count) 470. FIG. 4C illustrates a portion of a defragmentation process useful for defragmenting portions of free memory in memory 506. As illustrated in FIG. 4C, a query such as sys.dm_db_index_physical_stats (as described above) may return objects of various sizes. In the example depicted in FIG. 4C, there are 4 objects returned. All 4 objects are a clustered index type, and all 4 objects use a type of data allocation called in_row_data. As shown in FIG. 4C, the second and fourth objects have the lowest average space used (in percent). A threshold may determine that only select number of objects are to be defragmented. In this case, the second and fourth objects may be identified for possible defragmentation.

FIG. 4D depicts a table 404 storing information such as database identification (database_id) 410, object identification (object_id) 422, index identification (index_id) 424, the average fragmentation as a percent (avg_frag_in_percent) 436, the average page space used as a percent (avg_page_space_used_in_percent) 446, the average page space free 480 in bytes in secondary memory 506 (calculated), and the index level (index_level) 482. FIG. 4D illustrates a portion of a defragmentation process useful for defragmenting portions of free memory in memory 506. As illustrated in FIG. 4D, data may be aggregated and the index fragmentation and memory free space data per index may be ranked. For example, a first index with an object_id of 341576255 has an average degree of fragmentation of 33.33, an average page space used of 96.95, an average page space free (in bytes) of 249.65 and an average page free space in memory 506 of 7907.14 and a second index with an object_id of 741577680 has an average degree of fragmentation of 44.44, an average page space used of 91.68, an average page space free (in bytes) of 681.37 and an average page free space in memory 506 of 3755. Thus, although the second index has more fragmentation and utilizes less page space, and has higher page space free in secondary memory 506, the first index has a higher average page free space in memory 506. Thus, defragmenting the first index will be a higher priority than the second index.

The memory monitoring and selective defragmentation method and system 500 disclosed herein may also allow calculations over time or for a point in time. For example, active page free space may be tracked over time to give an average improvement or measure current active page free space and provide a predicted improvement based on current behavior. Calculating active page free space over time allows the memory monitoring and selective defragmentation application 502 to identify pages or sections of data which are generally static or highly active. For example, data for an online store may be relatively volatile for the first 6 months, then become increasingly more static. Calculating active page free space over time allows a user to see when data can be moved to disc, or when defragmenting may be preferred.

In addition to performing the above-mentioned defragmentation process, the memory monitoring and selective defragmentation method and system 500 may further suggest table partitioning. For example, the memory monitoring and selective defragmentation method and system 500 may determine that a page should be split based on the amount of active page free space or the active page free space over time. Furthermore, a first page resulting from the split may begin with a high volume of free space to handle frequent insertions, and a second page may begin with a lower volume of free space because of data that is generally static.

In some environments, a page may be expected to change, particularly by addition of data. These pages may be referred to as "insert hot spots". Thus, some the memory monitoring and selective defragmentation method and system 500 may further identify pages that should be excluded from a life expectancy calculation or a free space calculation. Even if the pages have free space, they are not included in any calculation.

Concepts and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the disclosure. It should be understood, however, that the detailed description and the specific examples, while indicating preferred embodiments, are given by way of illustration only and not by way of limitation. Various substitutions, modifications, additions and/or rearrangements within the spirit and/or scope of the underlying concepts will become apparent to those skilled in the art from this disclosure. Embodiments discussed herein can be implemented in suitable computer-executable instructions that may reside on a computer readable medium (e.g., a HD), hardware circuitry or the like, or any combination.

Figure 6:
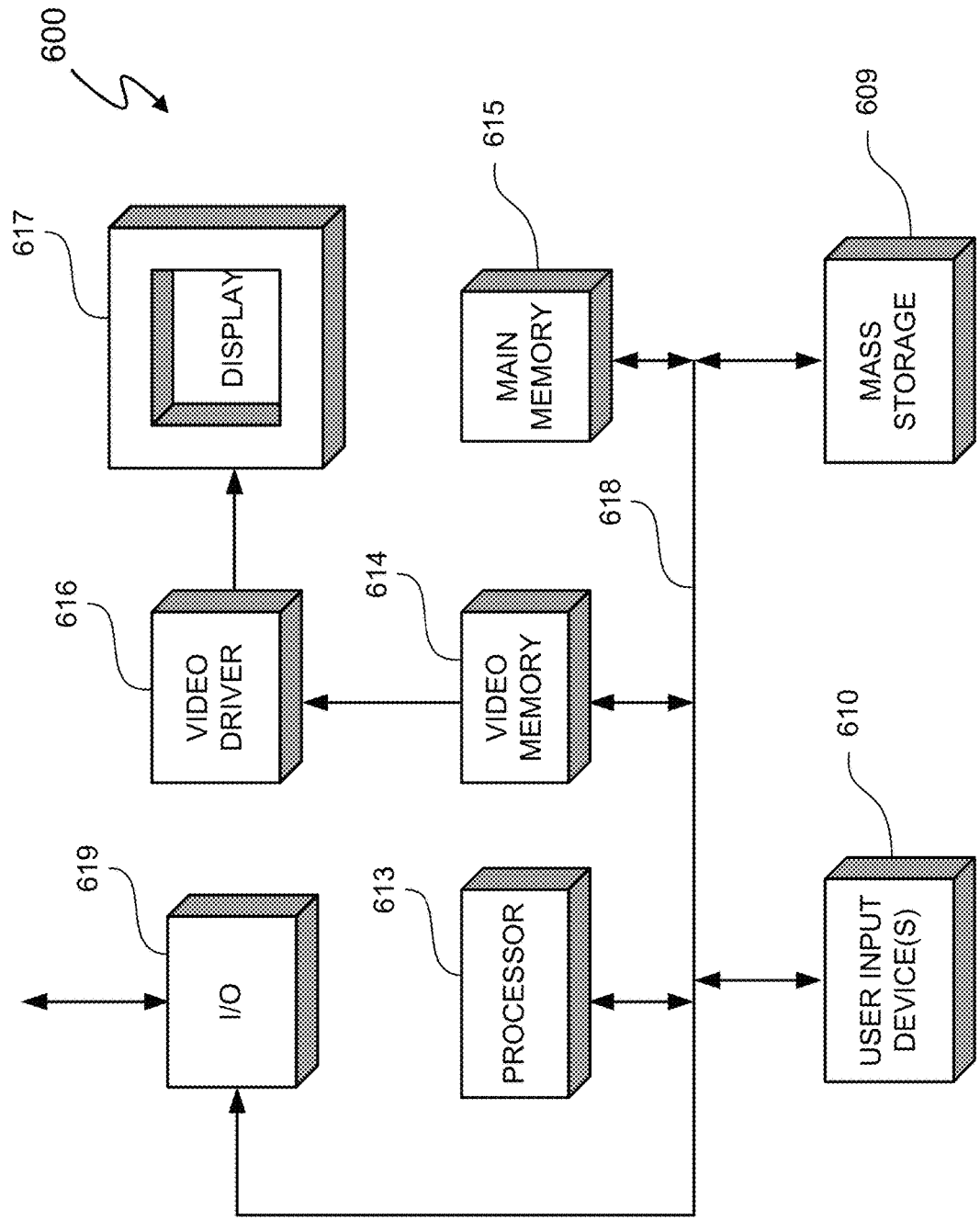
FIG. 6 depicts a computer system.

For example, embodiments of the client computer system 512, server 504, and database server 508 can be implemented on a computer system such as computer 600 illustrated in FIG. 6. Input user device(s) 610, such as a keyboard and/or mouse, are coupled to a bi-directional system bus 618. The input user device(s) 610 are for introducing user input to the computer system and communicating that user input to processor 613. The computer system of FIG. 6 generally also includes a non-transitory video memory 614, non-transitory main memory 615, and non-transitory mass storage 609, all coupled to bi-directional system bus 618 along with input user device(s) 610 and processor 613. The mass storage 609 may include both fixed and removable media, such as a hard drive, one or more compact disk ("CD") drives, digital versatile disk ("DVD"), solid state memory including flash memory, and other available mass storage technology. Bus 618 may contain, for example, 32 of 64 address lines for addressing video memory 614 or main memory 615. The system bus 618 also includes, for example, an n-bit data bus for transferring DATA between and among the components, such as CPU 609, main memory 615, video memory 614 and mass storage 609, where "n" is, for example, 32 or 64. Alternatively, multiplex data/address lines may be used instead of separate data and address lines.

I/O device(s) 619 may provide connections to peripheral devices, such as a printer, and may also provide a direct connection to a remote server computer system via a telephone link or to the Internet via an ISP. I/O device(s) 619 may also include a network interface device to provide a direct connection to a remote server computer system via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in a non-transient computer readable medium such as a flash memory, optical memory, magnetic memory, compact disks, digital versatile disks, and any other type of memory. The computer program is loaded from a non-transitory memory, such as mass storage 609, another non-transitory computer readable medium (such as a DVD, CD, flash memory drive, or data in the form of a signal, into main memory 615 for execution. Computer programs may also be in the form of electronic signals modulated in accordance with the computer program and data communication technology when transferred via a network.

The processor 613, in one embodiment, is a microprocessor manufactured by Motorola Inc. of Illinois, Intel Corporation of California, or Advanced Micro Devices of California. However, any other suitable single or multiple microprocessors or microcomputers may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the display 617. Video amplifier 616 is well known in the art and may be implemented by any suitable means. This circuitry converts pixel DATA stored in video memory 614 to a raster signal suitable for use by display 617. Display 617 is a type of monitor suitable for displaying graphic images.

When programmed by a computer program, for example, implement the client computer system 512, server 504, and database server 508, respectively, the computer program causes the computer 600 to function as a new machine that is unique from and a technical improvement over a general purpose computer implementing conventional functions and performing conventional operations. The computer system described above is for purposes of example only. In at least one embodiment, the client computer system 512, server 504, and database server 508 can be implemented completely in hardware using, for example, logic circuits and other circuits including field programmable gate arrays.

At least portions of the functionalities or processes described herein can be implemented in suitable computer-executable instructions. The computer-executable instructions may be stored as software code components or modules on one or more computer readable media. In one embodiment, the computer-executable instructions may include lines of complied C++, Java, HTML, or any other programming or scripting code.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such non limiting examples and illustrations includes, but is not limited to: "for example," "for instance," "e.g.," "in one embodiment."

Although embodiments have been described in detail, it should be understood that various changes, substitutions, and alterations can be made hereto without departing from the spirit and scope of the invention as defined by the appended claims.

What is claimed is:

1. A method for monitoring and selectively defragmenting one or more database indexes included in a database, the method comprising performing by an information handling system:
   monitoring secondary memory of the information handling system, wherein:
      the information handling system includes a main memory and secondary memory that collectively store the database including the one or more database indexes;
      the one or more database indexes are stored in the secondary memory;
      each of the one or more database indexes includes a respective number of pages;
      for each of the one or more database indexes, each of the pages includes data that is logically aligned in an order specified by the index; and
      for each of the one or more database indexes, the pages are stored in contiguous memory space in the secondary memory, each of the pages has a data capacity;
   modifying the data in the database, wherein:
      modifying the data causes fragmentation of at least one of the one or more indexes;
      fragmentation at least one of the one or more indexes is represented by at least one of:
         changes in the number of pages in one or more of the indexes; and
         logically aligned data in two or more pages of the one or more indexes is stored in non-contiguous memory space of the memory;
   identifying any free space in the pages of the one or more indexes stored in secondary memory;
   determining fragmentation statistics of the identified indexes;
   using the index fragmentation statistics to calculate secondary memory cost savings for rebuilding the one or more indexes, wherein using the index fragmentation statistics to calculate potential secondary memory cost savings for rebuilding indexes comprises at least one of:
      determining an average page life expectancy of each page associated with the active pages of fragmented indexes;
      determining additional storage needed for defragmentation of each of the indexes;
      determining an ability to perform read-ahead functions of each of the indexes; and
      determining the cost of defragmenting the pages by weighing each of the memory cost savings, the additional storage needed, the ability to perform read-ahead functions, and activity level and potential memory reclamation; and
   selectively defragmenting the one or more indexes in the secondary memory based on the secondary memory cost savings for rebuilding the one or more indexes.

2. The method of claim 1 wherein the database comprises a relational database.

3. The method of claim 1 wherein a client computer system is coupled to the information handling system, and selectively defragmenting the one or more indexes in the secondary memory comprises one or more of:
   (1) presenting a user of the client computer system with a set of the indexes for defragmentation; and
      receiving a selection from the client computer system of one or more of the indexes to defragment; and
   (2) the information handling system selects the one or more indexes for defragmentation.

4. The method of claim 3 further comprising:
   receiving an access request from the client computer system to access the information handling system and a memory monitoring and selective defragmentation application using a network communication connection; and
   providing the client computer system information, wherein the information includes one or more of results of monitoring the secondary memory of the information handling system, defragmentation options, past defragmentation operation data, and defragmentation control options that are selectable and operable by the client computer system.

5. The information handling system of claim 3 wherein the processor executes the monitoring and selective defragmentation application to cause the information handling system to further:
   receive an access request from the client computer system to access the electronic handling system and a memory monitoring and selective defragmentation application using a network communication connection; and
   provide the client computer system information, wherein the information includes one or more of results of monitoring the secondary memory of the information handling system, defragmentation options, past defragmentation operation data, and defragmentation control options that are selectable and operable by the client computer system.

6. The method of claim 1 further comprising:
   prioritizing the one or more indexes in the secondary memory for defragmentation.

7. The information handling system of claim 6 wherein to prioritize the one or more indexes in the secondary memory for defragmentation further comprises to:
   select the one or more indexes for defragmentation based on one or more of:
      a predicted amount of time to defragment each index;
      predicted savings to secondary memory attributable to defragmenting each of the indexes; and
      percentage of free space attributed to each of the indexes in the secondary memory that can be reclaimed with higher prioritization for indexes with higher percentage of free space.

8. The method of claim 6 wherein prioritizing the one or more indexes in the secondary memory for defragmentation comprises:
   selecting the one or more indexes for defragmentation based on one or more of:
      a predicted amount of time to defragment each index;
      predicted savings to secondary memory attributable to defragmenting each of the indexes; and
      percentage of free space attributed to each of the indexes in the secondary memory that can be reclaimed with higher prioritization for indexes with higher percentage of free space.

9. The method of claim 1 wherein determining index fragmentation statistics comprises:
   obtaining index fragmentation statistics to identify page free space across the indexes and an index fragmentation level, wherein the index fragmentation level indicates a number of the pages having available free space and indication of an amount of the available free space.

10. The method of claim 1 wherein using the index fragmentation statistics to calculate potential secondary memory cost savings for rebuilding indexes further comprises at least one of:
- determining secondary memory cost savings based on free space in each page associated with active pages of fragmented indexes; and
- determining activity level of the pages and potential memory reclamation of the pages having free space to target for defragmentation because of their activity level, free space, or the like.

11. The method of claim 1 wherein:
monitoring secondary memory of an information handling system comprises:
- storing index metadata in one or more index monitoring tables, wherein the metadata includes fragmentation and identification information of each of the indexes; and identifying indexes stored in the secondary memory comprises:
- using either (i) a direct interrogation query of the database or (ii) a query against the one or more index monitoring tables.

12. The method of claim 1 wherein monitoring secondary memory of an information handling system comprises:
monitoring secondary memory based on free memory space of the secondary memory and percentage of memory fragmentation of the secondary memory.

13. The method of claim 1 wherein the information handling system comprises a structured query language database server.

14. The method of claim 1 wherein logical alignment of data in the index is an alphabetical order.

15. The method of claim 1 wherein modifying the data in the relational database comprises at least one of the following:
- adding or removing data from one or more of the pages, wherein adding or removing the data causes at least one of the pages to be one or more of: (1) out of order in accordance with one or more of the indexes and (2) increases free space in at least one of the pages;
- adding one or more pages to one or more of the indexes, wherein the adding one or more pages to one or more of the indexes includes splitting one or more of the pages into multiple pages.

16. The method of claim 1 further comprising:
tracking free space of at least active pages of the one or more indexes over time to obtain an average improvement or a predicted improvement due to the defragmentation and allows the information handling system to identify pages or sections of data of the one or more indexes that are generally static or highly active and determine when data can be moved to secondary memory and when to perform the selective defragmenting.

17. The method of claim 1 further comprising:
determining when to split a page of the one or more indexes based on an amount of active page free space or active page free space over time.

18. The method of claim 1 wherein using the index fragmentation statistics to calculate potential secondary memory cost savings for rebuilding indexes further comprises:
- determining the average page life expectancy of each page associated with the active pages of fragmented indexes;
- determining the additional storage needed for the defragmentation of each of the indexes;
- determining the ability to perform the read-ahead functions of each of the indexes;
- determining the cost of defragmenting the pages by weighing each of the memory cost savings, the additional storage needed, the ability to perform read-ahead functions, and activity level and potential memory reclamation;
- determining the secondary memory cost savings based on free space in each page associated with the active pages of fragmented indexes; and
- determining the activity level of the pages and the potential memory reclamation of the pages having free space to targeted for defragmentation because of their activity level, free space, or the like.

19. An information handling system comprising:
a processor executing a monitoring and selective defragmentation application to cause the information handling system to:
monitor secondary memory of the information handling system, wherein:
- the information handling system includes a main memory and secondary memory that collectively store the database including the one or more database indexes;
- the one or more database indexes are stored in the secondary memory;
- each of the one or more database indexes includes a respective number of pages;
- for each of the one or more database indexes, each of the pages includes data that is logically aligned in an order specified by the index; and
- for each of the one or more database indexes, the pages are stored in contiguous memory space in the secondary memory, each of the pages has a data capacity;

modify the data in the database, wherein:
- modify the data causes fragmentation of at least one of the one or more indexes;
- fragmentation at least one of the one or more indexes is represented by at least one of:
  - changes in the number of pages in one or more of the indexes; and
  - logically aligned data in two or more pages of the one or more indexes is stored in non-contiguous memory space of the memory;

identify any free space in the pages of the one or more indexes stored in secondary memory;
determine fragmentation statistics of the identified indexes;
use the index fragmentation statistics to calculate secondary memory cost savings for rebuilding the one or more indexes, wherein to use the index fragmentation statistics to calculate potential secondary memory cost savings for rebuilding indexes comprises to perform at least one of:
- determine an average page life expectancy of each page associated with the active pages of fragmented indexes;
- determine additional storage needed for defragmentation of each of the indexes;
- determine an ability to perform read-ahead functions of each of the indexes; and
- determine the cost of defragmenting the pages by weighing each of the memory cost savings, the additional needed, the ability to perform read-ahead functions, and activity level and potential memory reclamation; and
selectively defragment the one or more indexes in the secondary memory based on the secondary memory cost savings for rebuilding the one or more indexes.

20. The information handling system of claim 19 wherein the database comprises a relational database.

21. The information handling system of claim 19 wherein a client computer system is coupled to the information handling system, and selectively defragmenting the one or more indexes in the secondary memory comprises one or more of:
   (1) presenting a user of the client computer system with a set of the indexes for defragmentation; and
      receiving a selection from the client computer system of one or more of the indexes to defragment; and
   (2) the information handling system selects the one or more indexes for defragmentation.

22. The information handling system of claim 19 wherein the processor executes the monitoring and selective defragmentation application to cause the information handling system to further:
   prioritize the one or more indexes in the secondary memory for defragmentation.

23. The information handling system of claim 19 wherein to determine the index fragmentation statistics comprises:
   obtaining index fragmentation statistics to identify page free space across the indexes and an index fragmentation level, wherein the index fragmentation level indicates a number of the pages having available free space and indication of an amount of the available free space.

24. The information handling system of claim 19 wherein to use the index fragmentation statistics to calculate potential secondary memory cost savings for rebuilding indexes further comprises to perform at least one of:
   determine secondary memory cost savings based on free space in each page associated with active pages of fragmented indexes; and
   determine activity level of the pages and potential memory reclamation of the pages having free space to target for defragmentation because of their activity level, free space, or the like.

25. The information handling system of claim 19 wherein:
   to monitor secondary memory of an information handling system comprises to:
      store index metadata in one or more index monitoring tables, wherein the metadata includes fragmentation and identification information of each of the indexes; and
   to identify indexes stored in the secondary memory comprises to:
      use either (i) a direct interrogation query of the database or (ii) a query against the one or more index monitoring tables.

26. The information handling system of claim 19 wherein to monitor secondary memory of an information handling system comprises to:
   monitor secondary memory based on free memory space of the secondary memory and percentage of memory fragmentation of the secondary memory.

27. The information handling system of claim 19 wherein the information handling system comprises a structured query language database server.

28. The information handling system of claim 19 wherein logical alignment of data in the index is an alphabetical order.

29. The information handling system of claim 19 wherein to modify the data in the relational database comprises at least one of the following:
   add or removing data from one or more of the pages, wherein adding or removing the data causes at least one of the pages to be one or more of: (1) out of order in accordance with one or more of the indexes and (2) increases free space in at least one of the pages;
   add one or more pages to one or more of the indexes, wherein the adding one or more pages to one or more of the indexes includes splitting one or more of the pages into multiple pages.

30. The information handling system of claim 19 wherein the processor executes the monitoring and selective defragmentation application to cause the information handling system to further:
   track free space of at least active pages of the one or more indexes over time to obtain an average improvement or a predicted improvement due to the defragmentation and allows the information handling system to identify pages or sections of data of the one or more indexes that are generally static or highly active and determine when data can be moved to secondary memory and when to perform the selective defragmenting.

31. The information handling system of claim 19 wherein the processor executes the monitoring and selective defragmentation application to cause the information handling system to further:
   determine when to split a page of the one or more indexes based on an amount of active page free space or active page free space over time.

32. A non-transitory, computer program product comprising code stored therein and executable by a processor to perform the method of claim 1.

33. The information handling system of claim 19 wherein to use the index fragmentation statistics to calculate potential secondary memory cost savings for rebuilding indexes further comprises to perform:
   determine the average page life expectancy of each page associated with the active pages of fragmented indexes;
   determine the additional storage needed for the defragmentation of each of the indexes;
   determine the ability to perform the read-ahead functions of each of the indexes;
   determine the cost of defragmenting the pages by weighing each of the memory cost savings, the additional storage needed, the ability to perform read-ahead functions, and activity level and potential memory reclamation;
   determine the secondary memory cost savings based on free space in each page associated with the active pages of fragmented indexes; and
   determine the activity level of the pages and the potential memory reclamation of the pages having free space to targeted for defragmentation because of their activity level, free space, or the like.

* * * * *